2,932,636

TRIAZOLE AZO DYESTUFFS

Fritz Suckfüll, Leverkusen, and Horst Nickel, Koln-Stammheim, Germany, assignors to Farbenfabriken Bayer Aktiengesellschaft, Leverkusen, Germany, a corporation of Germany No Drawing. Application June 18, 1958
Serial No. 742,745

Claims priority, application Germany July 11, 1957

5 Claims. (Cl. 260—157)

The present invention relates to new azo dyestuffs; more particularly it relates to azo dyestuffs having the following general formula

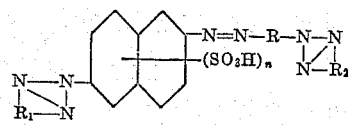

In this formula R means a radical of the benzene or naphthalene series which contains the azo bridge and the triazole grouping in p-position to one another, $R_1$ and $R_2$ denote radicals of similar or different amino group-containing coupling components bearing the nitrogen atoms of the triazole ring in o-position to one another, and $n$ stands for the number 1 or 2.

The new azo dyestuffs are obtainable by coupling a diazotized 2-amino-6-nitronaphthalene-sulfonic acid with an azo component having an amino group in the o-position to the amino group, transforming the amino azo dyestuff into the corresponding triazole compound, converting the nitro group in the latter into an amino group, diazotizing, coupling with an amino compound of the benzene or naphthalene series in the p-position to the amino group, further diazotizing, coupling with a compound having an amino group in the o-position to the amino group, and converting the o-amino-azo grouping into a triazole ring.

Similar dyestuffs are obtainable by starting from 2-acetylamino-6-aminonaphthalene-sulfonic acids, diazotizing and coupling, splitting off the acetyl group after the first triazolation, and otherwise proceeding in the manner indicated above.

A further method of carrying out the process consists in coupling a diazotized 2-amino-6-nitronaphthalene-sulfonic acid with an amino compound of the benzene or naphthalene series in the p-position to the amino group, further diazotizing, coupling with a compound containing an amino in the o-position to the amino group, triazolizing, reducing the nitro group, diazotizing, coupling with an amino compound to form the o-amino-azo dyestuff, and subsequently again triazolizing.

Finally, the new dyestuffs may also be produced by reducing a p-amino azo dyestuff obtained from a diazotized 2-amino-6-nitronaphthalene-sulfonic acid by coupling with an amino compound of the benzene or naphthalene series to form the diamino azo dyestuff, tetrazotizing, coupling with two mols of the same or different amino compounds to form the o,o'-diaminoazo dyestuff and triazolizing both sides.

The conversion of the o-amino azo dyestuffs into the corresponding triazole compounds is carried out by methods known as such, for example by the action of an ammoniacal cupric salt solution or with a solution of sodium hypochlorite. The conversion of the nitro group into an amino group may be effected for example with sodium sulfide or with iron and acetic acid.

2-amino-6-nitro-naphthalene-sulfonic acids suitable for the process are for example 2-amino-6-nitro-naphthalene-8-sulfonic acid and 2-amino-6-nitro-naphthalene-4,8-disulfonic acid.

As amino compounds capable of triazolation after coupling there may be considered for example: 2-aminonaphthalene, 2-aminonaphthalene-5-sulfonic acid, 2-aminonaphthalene-6-sulfonic acid, 2-aminonaphthalene-3,6-disulfonic acid, 1-aminonaphthalene-4-sulfonic acid.

Suitable amino compounds of the benzene or naphthalene series which couple in the p-position to the amino group and may then be further diazotized, are for example aminobenzene, 1-amino-3-methylbenzene, 1-aminobenzene-2-sulfonic acid, 1-aminonaphthalene, 1-aminonaphthalene-6-sulfonic acid, 1-aminonaphthalene-7-sulfonic acid.

The new dyestuffs dye fibres from natural or regenerated cellulose in chiefly yellow shades of excellent fastness to light.

The following examples are given for the purpose of illustrating the invention without, however, limiting it thereto.

EXAMPLE 1

34.8 parts by weight (0.1 mol) of 2-amino-6-nitro-naphthalene-4,8-disulfonic acid are diazotized as usual and combined at 0° C. with a solution of 22.3 parts by weight of 2-aminonaphthalene-6-sulfonic acid in 500 parts by volume of water and 25 parts by volume of a 20 percent sodium carbonate solution and then coupled in usual manner. After termination of the coupling, the precipitated dyestuff is isolated by filtering off with suction.

The paste thus obtained is dissolved in 1000 parts by volume of hot water and treated with a solution of 56 parts by weight of crystalline copper sulfate in 140 parts by volume of water and 130 parts by volume of a 25 percent ammonia solution. The mixture is then stirred at 90–95° C. for about 3 hours, until the triazolation is completed. After cooling to room temperature, the product is filtered off with suction, the paste is stirred in 4300 parts by volume of water and 140 parts by volume of a 20 percent sodium carbonate solution at 80° C., filtered off with suction and the reaction product is salted out from the filtrate with sodium chloride and isolated.

The paste of the triazole compound thus obtained is stirred in 140 parts by volume of weakly acetic water and treated at 90–95° C. with approximately 70 parts by weight of iron powder and about 7 parts by volume of glacial acetic acid, until the reduction of the nitro group into the amino group is completed. The product is then rendered alkaline with 60 parts by volume of a 20 percent sodium carbonate solution, filtered off with suction, and the aminotriazole compound is precipitated in the filtrate with hydrochloric acid and isolated.

0.1 mol of the aminotriazole compound is dissolved weakly soda-alkaline in 900 parts by volume of water, treated with 69 parts by volume of a 10 percent sodium nitrite solution and added with stirring at 15° C. to a mixture of 42 parts by volume of hydrochloric acid ($d$ 1.14) and 50 parts by volume of water. After termination of the diazotization there is added at 0–3° C. a solution of 10.7 parts by weight of 1-amino-3-methyl-benzene in 50 parts by volume of water and 15 parts by volume of hydrochloric acid ($d$ 1.14) and then 150 parts by volume of a 20 percent sodium acetate solution. After completion of the coupling, the reaction product is isolated, acid to Congo.

The compound thus obtained is dissolved weakly soda alkaline in 2100 parts by volume of water, treated with 69 parts by volume of a 10 percent sodium nitrite solution and diazotized at 40° C. After termination of the diazotization the isolated diazonium salt is coupled at 0–3° C. with a neutral solution of 22.3 parts by weight of 2-amino-naphthalene-6-sulfonic acid in 600 parts by volume of water and the amino-disazo dyestuff is then isolated.

The paste thus obtained is dissolved in 1400 parts by volume of hot water as described above, treated with a solution of 56 parts by weight of crystalline copper sulfate in 140 parts by volume of water and 130 parts by volume of a 25 percent ammonia solution and boiled, until the triazolization is completed. After separating the cuprous oxide by filtration—with, if necessary, the addition of animal charcoal—the dyestuff is precipitated in the filtrate with sodium chloride and isolated.

The dyestuff thus formed corresponds in the form of the free acid to the formula

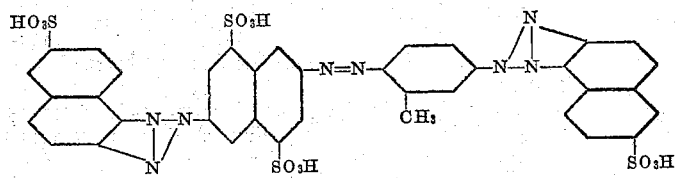

The dry dyestuff is a brown powder which dissolves in water with a yellow coloration and dyes cotton in yellow shades of very good fastness to light.

If instead of 2-aminonaphthalene-6-sulfonic acid, the equivalent amount of 2-aminonaphthalene-3,6-disulfonic acid is used as an initial coupling component and otherwise proceeding in a similar manner, a cotton dyestuff is obtained of similar dyeing properties.

When replacing in the present example the middle component, i.e. 1-amino-3-methylbenzene, by an equivalent amount of aniline, preferably in the form of the ω-methane-sulfonic acid compound, and subsequently saponifying in usual manner, or when using an equivalent amount of 1-amino-benzene-2-sulfonic acid and proceeding otherwise as described above, dyestuffs are obtained which likewise dye cotton in yellow shades.

When replacing the middle component 1-amino-3-methylbenzene by an equivalent amount of 1-aminonaphthalene-6-sulfonic acid, a dyestuff is obtained which dyes cotton in golden yellow shades.

If, instead of 2-aminonaphthalene-6-sulfonic acid, an equivalent amount of 2-aminonaphthalene-3,6-disulfonic acid is used as an end component, a dyestuff is obtained which dyes cotton in a yellow shade.

EXAMPLE 2

34.8 parts by weight (0.1 mol) of 2-amino-6-nitronaphthalene-4,8-disulfonic acid are diazotized, combined at 0–3° C. with a solution of 10.7 parts by weight of 1-amino-3-methylbenzene in 50 parts by volume of water and 15 parts by volume of hydrochloric acid ($d$ 1.14), and, after the addition of 150 parts by volume of a 20 percent sodium acetate solution, the coupling is completed, and the dyestuff thus obtained is isolated.

The paste is dissolved soda alkaline in 800 parts by volume of water, treated with 69 parts by volume of a 10 percent sodium nitrite solution and diazotized by running the mixture into 42 parts by volume of hydrochloric acid ($d$ 1.14) diluted with 50 parts by volume of water, whilst stirring. After completion of the diazotization, a neutral solution of 30.3 parts by weight of 2-aminonaphthalene-3,6-disulfonic acid in 300 parts of water is added, coupling is completed at 0° C. by the addition of 140 parts by volume of a 20 percent sodium acetate solution and subsequently salted out with sodium chloride and isolated.

The paste thus obtained is treated with an ammoniacal copper sulfate solution as described in Example 1, until triazolization is completed. The product is worked up as usual and the nitro-triazole compound is isolated.

The paste thus obtained is dissolved neutral in 1100 parts by volume of water and treated at about 60° C. with a solution of 42 parts by weight of crystalline sodium sulfide in 100 parts by volume of water, isolated acid to Congo after completion of the reduction, dissolved soda alkaline and filtered.

The weakly soda alkaline filtrate is treated with 69 parts by volume of a 10 percent sodium nitrite solution and diazotized by running into hydrochloric acid. After completion of diazotizing, a solution of 22.3 parts by weight of 2-aminonaphthalene-6-sulfonic acid in 500 parts by volume of water is added, coupling is completed, the dyestuff salted out with sodium chloride and isolated.

The paste is dissolved in 1200 parts by volume of hot water, triazolized with an ammoniacal copper sulfate solution as described above, and isolated.

The dry dyestuff is a brown powder which dissolves in water with a yellow coloration and dyes cotton in yellow shades.

EXAMPLE 3

34.8 parts by weight (0.1 mol) of 2-amino-6-nitronaphthalene-4,8-disulfonic acid are diazotized, coupled with 10.7 parts by weight of 1-amino-3-methylbenzene and isolated as described in Example 2.

The paste thus obtained is stirred with 700 parts by volume of water, rendered weakly soda alkaline, heated to 60° C., treated with a solution of 42 parts by weight of crystalline sodium sulfide in 100 parts by volume of water, and kept at 60° C., until the reduction is completed. The product is isolated with sodium chloride, acid to Congo, redissolved alkaline and filtered.

The weakly soda alkaline filtrate is treated with 138 parts by volume of a 10 percent sodium nitrite solution and tetrazotized by running into 84 parts by volume of hydrochloric acid ($d$ 1.14). After completion of the tetrazotization, a neutral solution of 44.6 parts by weight of 2-aminonaphthalene-6-sulfonic acid in 1000 parts by volume of water is added at 0–3° C. and coupling is completed.

The paste thus obtained is dissolved in 1200 parts by volume of hot water and treated with twice the amount of ammoniacal copper sulfate solution indicated in Example 1, until triazolization is completed. After isolation and drying, a brown powder is obtained which dissolves in water with a yellow coloration. The dyestuff dyes cotton similarly to the compound obtainable according to Example 1 in yellow shades.

When replacing in this example the 2-amino-6-nitronaphthalene-4,8-disulfonic acid by an equivalent amount of 2-acetylamino-6-aminonaphthalene-4,8-disulfonic acid, and effecting, instead of the reduction with sodium sulfide, a saponification with a sodium hydroxide solution, but otherwise proceeding in the same manner, a dyestuff of similar properties is obtained.

EXAMPLE 4

100 parts by weight of cotton are introduced at room temperature into a dyebath containing, dissolved in 5000 parts by volume of water, 2 parts by weight of the first dyestuff of Example 1, 1 part by weight of sodium carbonate and 20 parts by weight of sodium sulfate. The dyebath is heated to 90–95° C. within about half an hour and kept at this temperature for half an hour. The cotton is then rinsed and dried. A yellow dyeing of very good fastness to light is thus obtained.

EXAMPLE 5

Valuable dyestuffs are obtained if in Example 1 diazotized 2-amino-6-nitronaphthalene-4,8-disulfonic acid is first coupled with one of the coupling components listed in column I of the following table, after triazolation and reduction of the nitro group the diazo compound of the amino group containing triazole coupled with one of the middle components mentioned in column II and finally combined with one of the end components of column III and triazolized.

Table

| Initial component—aminonaphthalene sulfonic acid | Middle component | End component—aminonaphthalene sulfonic acid | Shade on cotton of the coppered azo dyestuff |
|---|---|---|---|
| 1–4 | 1-amino-3-methylbenzene. | 1–4 | yellow. |
| 2–5 | ---do--- | 1–4 | Do. |
| 2–5 | ---do--- | 2–5 | Do. |
| 2–5 | ---do--- | 2–6 | Do. |
| 2–5 | aniline | 2–5 | Do. |
| 2–5 | 1-amino-2-methoxy-5-methylbenzene. | 2–5 | Do. |
| 2–5 | ---do--- | 2–6 | Do. |
| 2–5 | 1-amino-naphthalene-6-sulfonic acid. | 2–5 | yellowish-orange. |
| 2–5 | ---do--- | 2–6 | Do. |
| 2–5 | 1-amino-2-methoxy-naphthalene-6-sulfonic acid. | 2–6 | yellow. |
| 2–3,6 | 1-amino-2-methoxy-5-methylbenzene. | 2–5 | Do. |
| 2–3,6 | ---do--- | 2–6 | Do. |
| 2–3,6 | 1-amino-2,5-dimethoxybenzene. | 2–5 | yellowish-orange. |
| 2–3,6 | ---do--- | 2–6 | Do. |
| 2–3,6 | 1-amino-2-methoxy-naphthalene-7-sulfonic acid. | 2–6 | yellow. |

EXAMPLE 6

If as middle component instead of 1-amino-3-methylbenzene equivalent quantities of 1-aminobenzene-2-carboxylic acid are used dyestuff is obtained which dye cotton in fast yellow shades.

EXAMPLE 7

26.8 parts by weight (0.1 mol) of 2-amino-6-nitronaphthalene-8-sulfonic acid are diazotized as described in Example 1 coupled with 30.3 parts by weight (0.1 mol) of 2-amino-naphthalene-3,6-disulfonic acid and triazolated. After reduction of the nitro group into the amino group the compound is further diazotized coupled with 10.7 parts by weight of 1-amino-3-methylbenzene diazotized again coupled with 22.3 parts by weight of 2-aminonaphthalene-6-sulfonic acid and finally triazolized. The dyestuff thus obtained dyes cotton in yellow shades having very good fastness to light.

We claim:

1. Azo dyestuffs of the formula

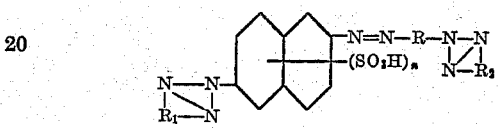

wherein R stands for a member selected from the group consisting of a radical of the benzene and naphthalene series containing the azo bridge and the triazole grouping in the p-position to one another, $R_1$ and $R_2$ mean radicals of coupling component of a naphthalene sulfonic acid bearing the nitrogen atoms of the triazole ring in the o-position to one another, and $n$ stands for one of the integers 1 and 2.

2. The azo dyestuff corresponding to the formula

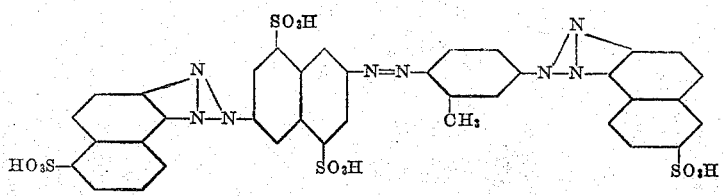

3. The azo dyestuff corresponding to the formula

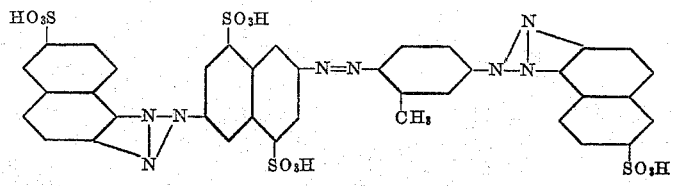

4. The azo dyestuff corresponding to the formula

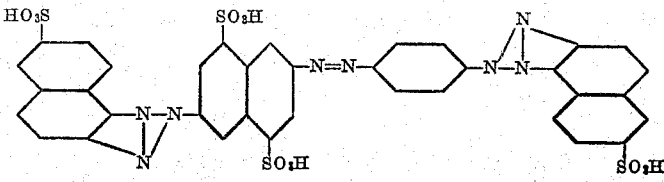

5. The azo dyestuff corresponding to the formula

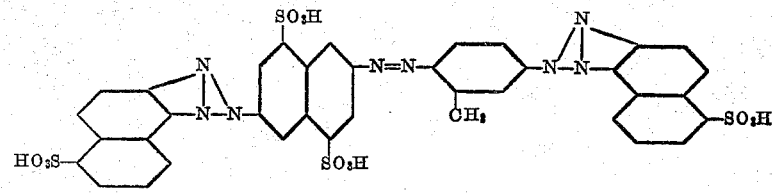

References Cited in the file of this patent

UNITED STATES PATENTS 2,232,078    Schindhelm _____ Feb. 18, 1941